(12) United States Patent
Wang et al.

(10) Patent No.: US 10,150,470 B2
(45) Date of Patent: Dec. 11, 2018

(54) DETERMINING AVAILABLE DYNAMIC TURNING RADIUS

(71) Applicant: Ford Global Technologies, LLC, Dearborn, MI (US)

(72) Inventors: Dexin Wang, Livonia, MI (US); Douglas Scott Rhode, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 13 days.

(21) Appl. No.: 15/245,281

(22) Filed: Aug. 24, 2016

(65) Prior Publication Data

US 2018/0056986 A1 Mar. 1, 2018

(51) Int. Cl.
| | |
|---|---|
| *B62D 5/04* | (2006.01) |
| *B60W 30/18* | (2012.01) |
| *B60W 30/045* | (2012.01) |
| *B60W 40/105* | (2012.01) |
| *G05D 1/02* | (2006.01) |

(52) U.S. Cl.
CPC .... *B60W 30/045* (2013.01); *B60W 30/18145* (2013.01); *B60W 40/105* (2013.01); *B62D 5/0421* (2013.01); *G05D 1/0223* (2013.01); *B60W 2710/20* (2013.01); *B60W 2720/125* (2013.01); *B60W 2720/24* (2013.01); *G05D 2201/0213* (2013.01)

(58) Field of Classification Search
CPC ......... B60W 30/045; B60W 30/18145; B60W 40/105; B60W 2710/20; B60W 2720/125; B60W 2720/24; B62D 5/0421; G05D 1/0223
See application file for complete search history.

(56) References Cited

U.S. PATENT DOCUMENTS

| | | | |
|---|---|---|---|
| 5,948,029 | A | 9/1999 | Straetker |
| 7,979,174 | B2 | 7/2011 | Fregene et al. |
| 8,061,459 | B2 | 11/2011 | Oehme |
| 9,302,704 | B2 | 4/2016 | Ezoe |
| 2011/0231052 | A1 | 9/2011 | Ellis et al. |
| 2012/0136540 | A1 | 5/2012 | Miller et al. |
| 2013/0253793 | A1 | 9/2013 | Lee et al. |

(Continued)

FOREIGN PATENT DOCUMENTS

| | | |
|---|---|---|
| GB | 2382553 A | 4/2003 |
| RU | 2285624 C2 | 10/2006 |

OTHER PUBLICATIONS

Search Report dated Dec. 21, 2017 from UK Intellectual Property Office regarding GB Application No. 1713309.1 (4 pages).

*Primary Examiner* — Aaron L Troost

(74) *Attorney, Agent, or Firm* — Frank A. MacKenzie; Bejin Bieneman PLC

(57) ABSTRACT

A system includes a computing device that includes a processor and a memory. The memory stores instructions executable by the processor. One instruction is to determine a transition in performance of a steering system actuator of a vehicle to a diminished operating mode. Another instruction is to determine a maneuverable envelope of vehicle velocity and path curvature adapted to the diminished operating mode. Another instruction is to select a vehicle velocity within the envelope for a path curvature.

18 Claims, 6 Drawing Sheets

(56) References Cited

U.S. PATENT DOCUMENTS

| | | | |
|---|---|---|---|
| 2015/0344070 A1* | 12/2015 | Han ................. | B62D 15/029 701/41 |
| 2016/0031444 A1* | 2/2016 | Fairgrieve ............ | B22D 21/005 701/93 |
| 2018/0037232 A1* | 2/2018 | Fu ................... | B60W 30/143 |

* cited by examiner

DETERMINING AVAILABLE DYNAMIC TURNING RADIUS

BACKGROUND

Autonomous vehicle steering control relies at least in part on an expected vehicle response based on predetermined inputs to the steering system. It is expected that the vehicle will be able to execute a turn of a particular curvature at a particular vehicle velocity. A problem arises, however, when an expected turning radius cannot be achieved. Such diminished steering system performance may cause an autonomous vehicle to perform in a manner inconsistent with control system commands that presume a fully functional steering system. Diminished steering performance may reduce a curvature, the curvature being an inverse of a turning radius, which a vehicle can accommodate at a particular vehicle velocity.

DETAILED DESCRIPTION

Introduction

An example system includes a computing device that includes a processor and a memory. The memory stores instructions executable by the processor such that the computer is programmed to determine a transition in performance of a steering system actuator of a vehicle to a diminished operating mode. The computer is further programmed to determine a maneuverable envelope of vehicle velocity and path curvature adapted to the diminished operating mode. The computer is yet further programmed to select a vehicle velocity within the envelope for a path curvature.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such exemplary orientations are from the perspective of an occupant seated in a driver seat, facing a dashboard.

Exemplary System Elements

Figure 1:
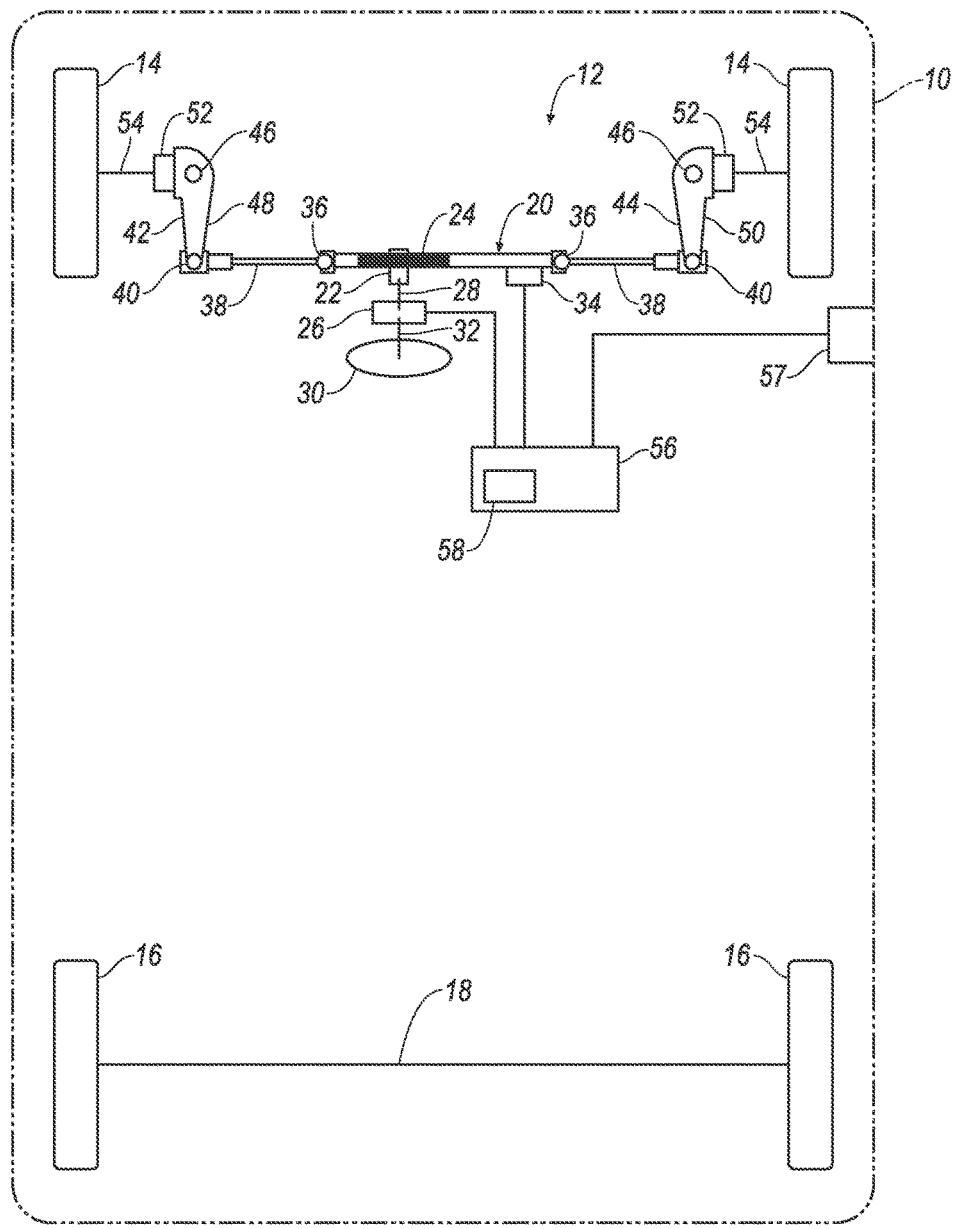
FIG. 1 is a schematic view of a vehicle including an exemplary steering system with the front wheels in a first orientation.

FIG. 1 illustrates an exemplary vehicle 10 having an exemplary steering system 12. Front wheels 14, each wheel 14 typically have a tire mounted thereon, are connected to steering system 12. Steering system 12 may be connected in part directly to a vehicle 10 structure, such as a vehicle 10 body or a vehicle 10 frame or subframe, all of which are well known. Steering system 12 may also be connected in part to a vehicle 10 front suspension which commonly includes a lower control arm (not shown). Vehicle 10 also includes rear wheels 16, each also typically including a tire, which may be attached to a rear axle 18. Rear axle 18 may be connected to a rear portion of the vehicle 10 structure such as a rear portion of the vehicle 10 body or the vehicle 10 frame or subframe by a rear suspension (not shown). In alternative configurations, such as with an independent rear suspension, a rear axle may not be included and the rear wheels 16 may be mounted to rear suspension knuckles through wheel bearings. The rear suspension and wheel mounting are not critical to the presently described steering system.

Figure 3:
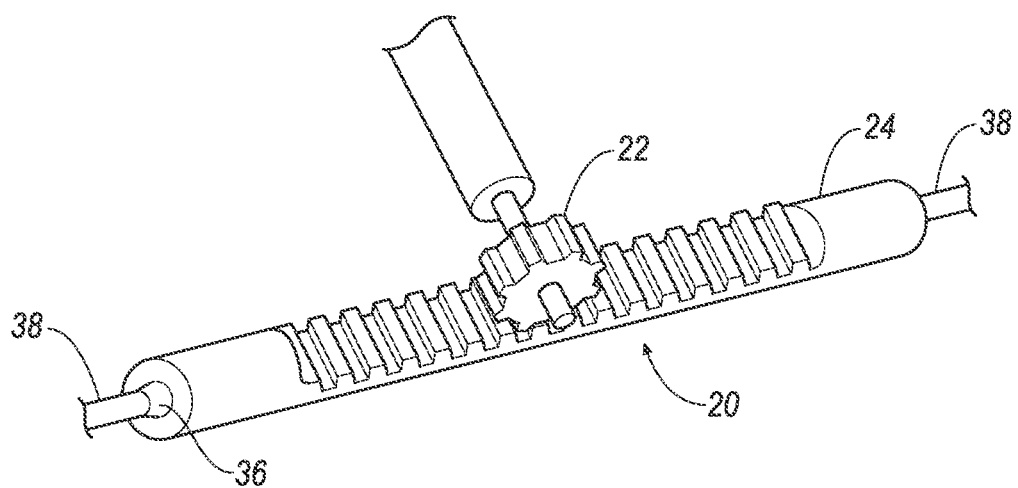
FIG. 3 is a perspective view of an exemplary rack and pinion steering gear arrangement.

A rack and pinion steering gear 20 is included as part of steering system 12. Steering gear 20 includes a pinion gear 22 and a rack 24 as best shown in FIG. 3. A steering actuator 26 is drivingly connected to pinion gear 22 by a lower steering column 28. A steering wheel 30 may be connected to lower steering column 28 through an upper steering column 32 and steering actuator 26. Steering wheel 30 and upper steering column 32 may be omitted in a completely autonomous vehicle. A rack displacement transducer or sensor 34 may be connected in part to rack 24 for measuring a lateral displacement of rack 24. Rack displacement sensor 34 may be in the form of a rotation sensor associated with pinion gear 22, as displacement of rack 24 will vary linearly with rotation of pinion gear 22. The tooth count on the pinion together with a tooth pitch determines a functional relationship between rotational displacement of the pinion gear 22 drivingly engaged with the steering rack and the displacement of rack 24. Sensor 34 may be used to determine both a displacement of rack 24 and a velocity of displacement of rack 24.

Inner tie rod ball joints 36 at opposite ends of rack 24 may pivotably connect tie rods 38 to rack 24. Outer tie rod ball joints 40 may pivotably connect tie rods 38 to a left steering knuckle 42 on a left side of steering system 12 and to a right steering knuckle 44 on a right side of steering system 12. Knuckles 42 and 44 may each be respectively pivotably connected by a suspension ball joint 46 to a left lower control arm (not shown) and a right lower control arm (not shown). The control arms comprise part of the front suspension and are connected to the vehicle structure. Left knuckle 42 may have a left steering arm 48 extending between the left side outer tie rod ball joint 40 and suspension ball joint 46. Right knuckle 44 may have a right steering arm 50 extending between the right side outer tie rod ball joint 40 and suspension ball joint 46. A wheel bearing 52 is mounted to each of knuckles 42 and 44. A spindle 54 is rotatably supported by each bearing 52, allowing rotation of spindle 54 relative to knuckles 42 and 44. Spindles 54 are each rotatably fixed to one of front wheels 14.

Figure 2:
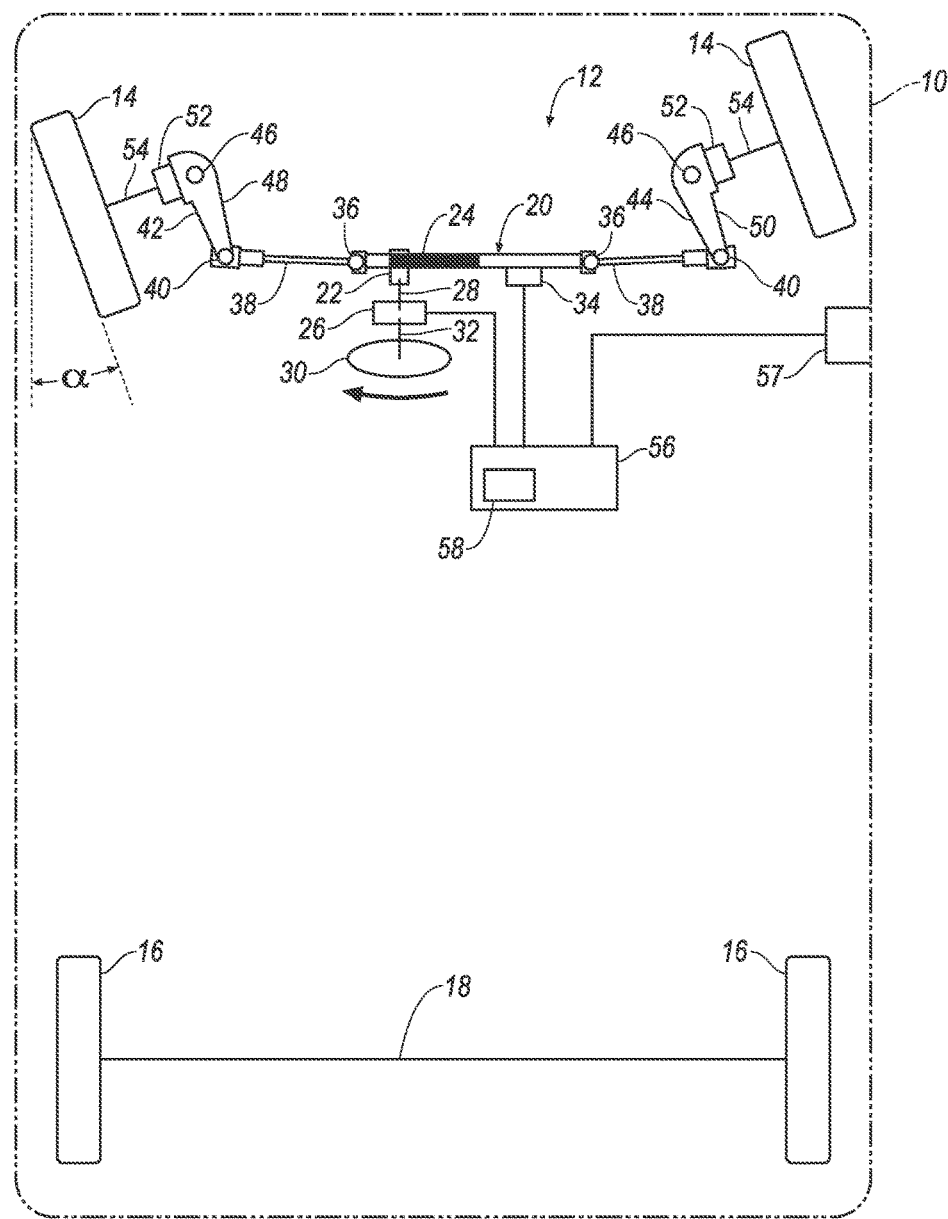
FIG. 2 is a schematic view of the vehicle and steering system of FIG. 1 with the front wheels in a second steering orientation.

Rotation of lower steering column 28 pivots knuckles 42, 44 and wheels 14. Rotation of lower steering column 28, through the engagement of pinion gear 22 and rack 24, laterally displaces rack 24. Lateral displacement of rack 24 displaces tie rods 38 which pivot steering arms 48 and 50 of knuckles 42 and 44 about ball joints 46. Knuckles 42, 44 may be additionally pivotably supported by upper ball joints mounted to upper control arms (not shown) or to a strut assembly (not shown) in a known manner. Wheels 14 are pivoted about ball joints 46 responsive to the displacement of the steering knuckle steering arms 48, 50. FIG. 1 illustrates wheels 14 and steering system 12 in a first orientation with wheels 14 in a straight-ahead orientation for driving vehicle 10 in a straight line. FIG. 2 illustrates wheels 14 and steering system in a second orientation with wheels 14 in a left-turn orientation for driving vehicle 10 in a left-directed arc. The inside or left wheel 14 is illustrated as being positioned at an angle α to the straight-ahead position of FIG. 1. The left or inside wheel 14 in FIG. 1 has an angle α of 0°. The angle of the right wheel in FIG. 2 may be less than the angle of the left wheel for a left turn, as the outboard tire will be tracking a slightly larger radius than the inside tire to avoid tire scrubbing. Such a variation in steering angle is known in the art, and may be provided by an exemplary Ackerman linkage as is known.

An on-board computer 56, alternatively referred to as a controller or an electronic control unit ("ECU"), may be electrically connected to each of actuator 26 and transducer 34. ECU 56 selectively allows selective connection of actuator to a source of electrical power. ECU 56 may be directly connected to actuator 26 or may be connected indirectly to actuator 26. An example indirect connection is connecting ECU 56 to a power relay (not shown) that is connected to actuator 26. Such power relays may be in the form of digital power relays, or solid state relays incorporating discrete electronic elements including transistors or electromechanical relays. The design of such relays or relay switches is known in the art. Sources of electrical power may include a battery, an alternator, and a direct current motor-generator.

Steering system 12 must provide some redundancy to preserve an ability, albeit a potentially diminished ability, to maneuver the vehicle in the event actuator 26 becomes compromised. Steering actuator 26 may be configured to provide such redundancy to allow the operation of the vehicle in a diminished steering mode. Actuator 26 may, by way of example, provide such redundancy by including an electric motor having two separate sets of windings.

A shaft from the motor may be drivingly connected to the pinion gear 22. In a fully functional or regular or normal mode of operation or normal operation mode, both sets of windings may be energized and may be used to supply torque to lower steering column 28. In an exemplary diminished mode of operation or diminished operating mode, only one set of windings may be operable and actuator 26 may only be able to provide half of the torque available in the regular mode of operation. In the diminished operating mode, actuator 26 may provide only half-power, or limited power which may be somewhat less than half-power, or fail-functional mode power which may be somewhat more or less than half-power. As an available magnitude of power from actuator 26 is diminished, so is the capability of the steering system 12.

Alternatively, actuator 26 may include two separate electric motors that are each connected to and received directions from ECU. Each motor may have its own set of windings providing the above-described redundancy. Collectively, actuator 26 may have two sets of windings.

Yet further alternatively, redundancy may be in the form of overlapping complementary systems (not illustrated) in which torque from an actuator of each system is required to achieve full steering assist torque, and the separate actuators are coordinated by ECU 56 to operate as a single integrated actuator.

Exemplary actuator 26 is sized to provide sufficient torque assist capability for relatively high-assist circumstances, such as static parking and high lateral acceleration cornering with high steering wheel angle rate. When operating in a diminished or limp-home mode of operation, the ability to execute such maneuvers may be restricted. An exemplary limp-home mode of operation may comprise using just one of the motors. An alternative limp-home mode of operation may comprise using both motors at a reduced level of power. In either case, the power available for adjusting steering wheel position in the diminished mode of operation is reduced.

The ECU 56 includes programming to autonomously operate the vehicle 10, e.g., a virtual driver 58 as is known. ECU 56 includes at least one electronic processor and an associated memory. The memory includes one or more forms of computer-readable media, and stores instructions executable by the processor for performing various operations, including such operations as disclosed herein.

The memory of ECU 56 also stores data. Data may include collected data that is collected from a variety of devices. In general, collected data may include any data that may be gathered by any data collection device 30 including sensors and/or computed from such data. Exemplary data collection devices 30 may include transducer 34, actuator 26, a lateral acceleration sensor 57, and autonomous driving sensors such as a radar sensor, a lidar sensor, a vision sensor and the like. The foregoing examples are not intended to be limiting. Other types of data collection devices may be used to provide data to ECU 56. Data may also include calculated data calculated in ECU 56 from collected data and from other calculated data.

The memory of ECU 56 stores data received via various communications mechanisms. ECU 56 may be configured for communications on a vehicle network such as an Ethernet network or a controller area network ("CAN") bus or the like, and/or for using other wired or wireless protocols, e.g., Bluetooth®, Bluetooth® Low Energy, or WiFi. ECU 56 may also have a connection to an onboard diagnostics connector such as an OBD-II connector. Via the CAN bus, OBD-II, Ethernet, and/or other wired or wireless mechanisms, ECU 56 may transmit messages to various devices in a vehicle and/or receive messages from the various devices, e.g., controllers, actuators, sensors, switches, etc. as discussed herein. Although ECU 56 is shown as a single ECU in FIG. 1 and FIG. 2 for ease of illustration, it is to be understood that ECU 56 could in fact include and various operations described herein could be carried out by one or more computing devices, e.g., vehicle component controllers such as are known and/or a computing device dedicated to the system 12.

The virtual driver 58 for autonomous driving sends actuation requests for vehicle 10 to follow a path curvature at certain velocity. An available path curvature and vehicle velocity are limited by vehicle dynamic stability properties when the steering system is fully functional and steering actuator 26 is properly sized. When vehicle dynamic limitations are exceeded, the tires of vehicle 10 may break traction with a road surface and may result in vehicle 10 sliding across the road surface.

It is desirable for the virtual driver 58 to know both the regular or full capability of steering actuator 26 and the more limited capability of steering actuator 26 operating in the diminished mode to allow safe execution of maneuvers such as high lateral acceleration maneuvers and high steering wheel angle rate maneuvers. Commonly, as noted above, with steering actuator 26 operating in its normal mode, vehicle maneuvers are limited by vehicle dynamic limitations rather than limitations of the steering actuator 26. However, execution of such maneuvers in the diminished mode of operation may instead be limited by the reduced capabilities of actuator 26. The execution of such maneuvers may require more torque from actuator 26 than actuator 26 is able to provide when it is operating in the reduced power or diminished mode of operation.

Figure 4:
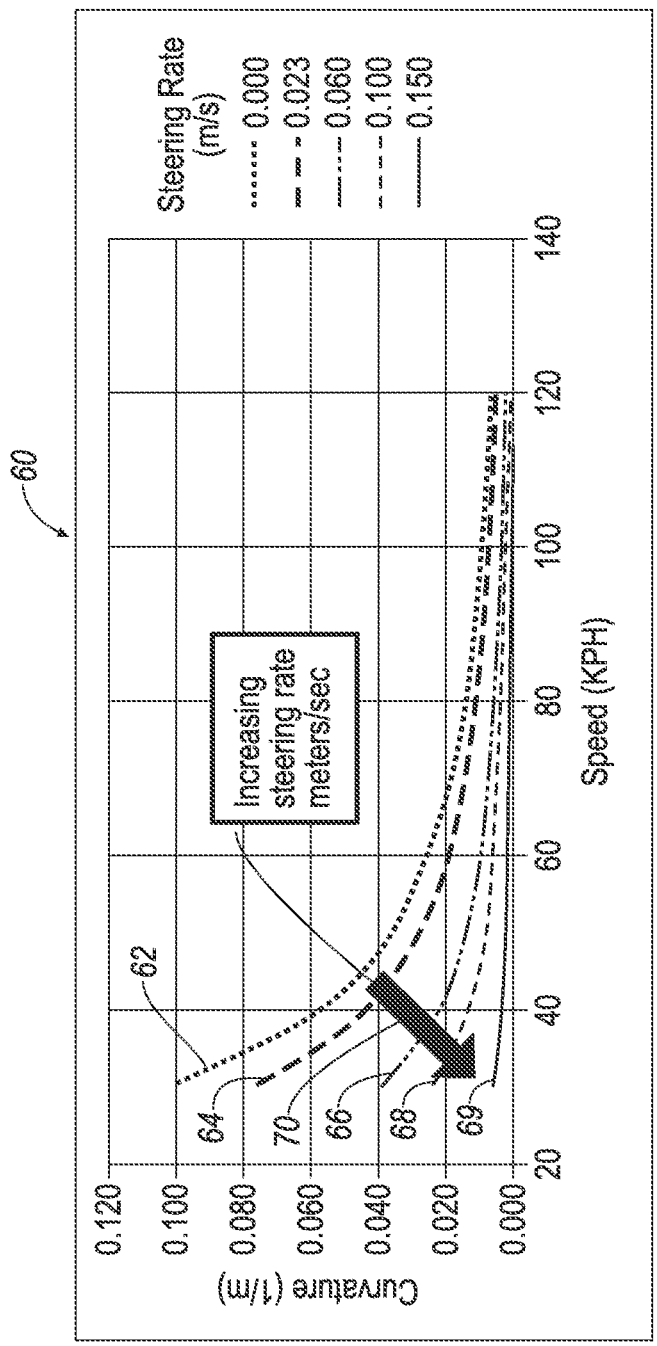
FIG. 4 is an exemplary plot of maneuverable envelopes defining velocity and curvature limits.

The capability of the steering system 12 and steering actuator 26 to handle such maneuvers, including maneuvers with high lateral acceleration or/and high steering rack displacement velocity, is established by determining through calculations maneuver limit envelopes such as those illustrated in plot 60 of FIG. 4 for the vehicle steering system 12. The envelopes 62, 64, 66, 68, 69 include the values of velocity and curvature to the left of and below each curve for the specified rack rates. The maneuver limit envelopes 62, 64, 66, 68, 69 define performance limits of velocity and curvature as a function of the available rack displacement rate, and the available rack displacement rate in turn depending on the available torque from actuator 26. A higher magnitude of rack force, and thus a higher magnitude of actuator torque, is required to move rack 24 at higher vehicle lateral acceleration. An arrow 70 points in the direction of increasing steering rack rate. The decrease in curvature with an increase in steering rate illustrates that increasing the steering rack rate or velocity yields a reduction in the ability of actuator 26 in its diminished mode to accommodate greater magnitudes of curvature. That is, vehicle 10 will not be able to turn or change lanes as quickly when the performance of actuator 26 is diminished. Available turn curvature decreases with both an increase in steering rate as well as an increase in available vehicle velocity.

Illustrated exemplary envelopes 62, 64, 66, 68, 69 can be calculated for both the diminished mode of operation or the normal mode of operation. Providing envelopes for both the regular or normal mode of operation and for the diminished mode of operation allows virtual driver 58 to reduce the velocity of vehicle 10 to execute a steering maneuver when steering actuator 26 is operating in the diminished performance mode, and further allows the virtual driver 58 to safely transition from operating in the normal mode of operation to the diminished mode of operation during such a maneuver when a change in the performance of actuator 26 is determined.

Maneuver limit envelopes may be calculated using an equation (equation 1):

$$V_x^2 \rho|_{max} = \beta_v \beta_m T_{m,max}(\omega_m),$$

with:

$V_x$=Forward velocity of vehicle 10;
$\rho$=Curvature (1/turning radius);
$T_{m,max}$=Max available torque from actuator 26 as a function of motor speed ($\omega_m$);
$\omega_m$=motor speed of rotation, a parameter subject to control by ECU 56;
$\beta_m$=kinematic functional relationship between the rack load and motor torque as may be established by an effective torque arm length between a center of pinion gear 22 and engagement between the teeth of gear 22 with the teeth of rack 24; and
$\beta_v$=functional relationship between a vehicle lateral acceleration $A_y$ and a steering rack load $F_r$, and determined by either computer modelling based on design parameters of the vehicle and the steering system and test validation of such models with instrumented vehicles, or real-time generation of the relationship using real-time data for values such as rack force $F_r$, $A_y$ and calculating $F_r$ given $A_y$, and determining values for $F_r$ saturation by estimating road friction and front wheel vertical loads.

As illustrated in FIG. 4, exemplary limit envelopes are plotted as a plurality of curved lines showing curvature $\rho$ in units of 1/meter as a function of vehicle velocity or speed $V_x$ in units of kilometers per hour, with one line for each rate of displacement of rack 24 or rack velocity or steering rate in units of meters per second, with rack velocity varying as a linear function of actuator motor speed $\omega_m$. Such linear function may be the effective torque arm length between the center of pinion gear 22 and engagement between the teeth of gear 22 with the teeth of rack 24. The maximum available torque $T_{m,max}$, as noted above, also varies with actuator motor speed $\omega_m$. The actuator motor torque $T_{m,max}$ to motor speed $\omega_m$ relationship may be available from the motor supplier or may be determined by testing or may be computer modelled and may be confirmed with testing. Values of $T_{m,max}$ may be established for actuator 26 in each of the regular or fully functional mode and the diminished mode or modes of operation.

Equation 1 may be derived as indicated below. The value of lateral vehicle acceleration $A_y$, based on a known relationship between centripetal acceleration of a body traveling along an arc of a curvature p at a velocity $V_x$, is equal to curvature $\rho$ times vehicle velocity $V_x$ squared. Restated as an equation (equation 2): $A_y = V_x^2 \rho$. Lateral vehicle acceleration $A_y$ is also equal to a function of rack force $F_r$ as indicated above, and may be expressed in equation form as (equation 3): $A_y = \beta_v F_r$. Rack force $F_r$ may be calculated as a function of actuator motor torque $T_m$ as indicated above and may be expressed in equation form as (equation 4): $F_r = \beta_m T_m(\omega_m)$. Torque $T_m$ may also be determined as a function of a current draw by the motor of actuator 26 in a known manner, or by incorporating a torque sensor between actuator 26 and pinion gear 22. Substituting equation 4 for rack force $F_r$ into equation 3 yields (equation 5): $A_y = \beta_v \beta_m T_m(\omega_m)$. Equating the values of lateral acceleration $A_y$ from equations 2 and 5 yields (equation 6): $V_x^2 \rho = \beta_v \beta_m T_m(\omega_m)$. Equation 1 may be reached by using the maximum available actuator torque value $T_{m,max}$ for torque $T_m$ at a motor speed $\omega_m$ in equation 6 (equation 1): $V_x^2 \rho|_{max} = \beta_v \beta_m T_{m,max}(\omega_m)$.

Figure 5:
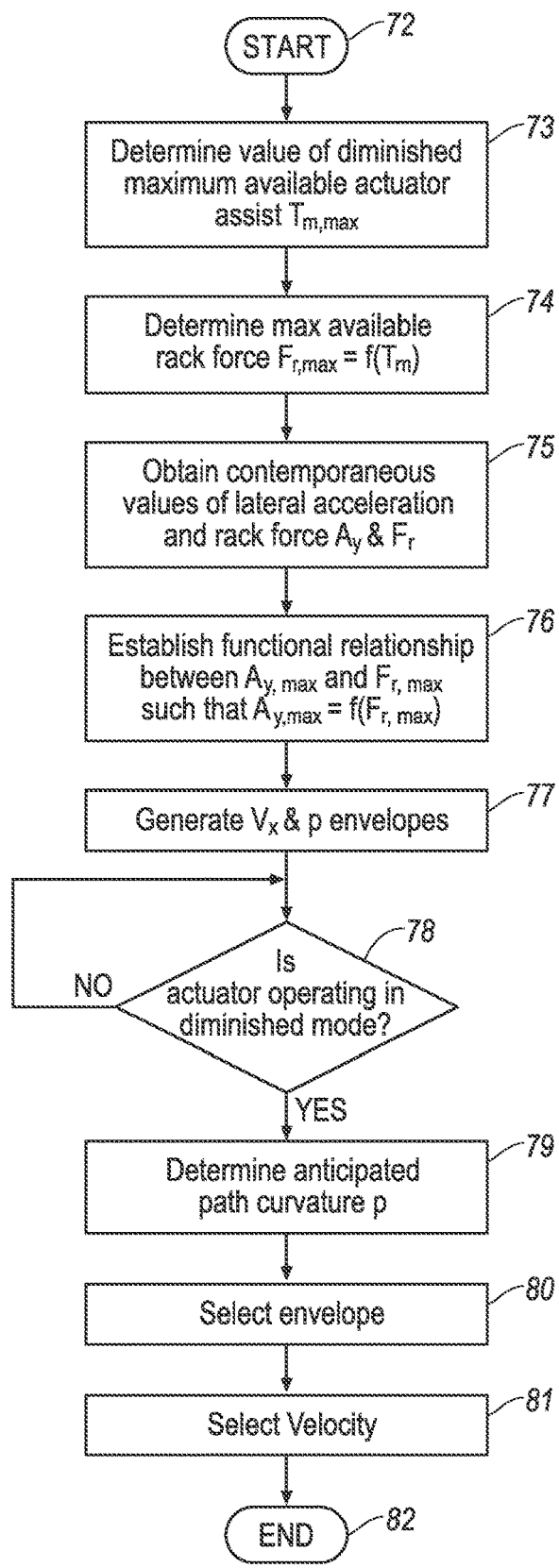
FIG. 5 is an exemplary flow chart for the determination of a velocity and curvature envelope.

A flow chart 71 illustrating the generation and use of envelopes consistent with the above description is presented in FIG. 5. Flow chart 71 is an example of a computer program and process logic that may be stored in ECU 56. The computer program 71 is initiated with a start block 72. Data indicative of a diminished or otherwise abnormally limited magnitude of available maximum torque assist $T_{m,max}$ from the motor or motors of actuator 26 is provided to or determined by ECU 56 in data block 73. Such data may be processed in process block 74 to determine, given the reduced available maximum torque $T_{m,max}$, an available maximum rack force $F_{r,max}$. Contemporaneous data indicative of the sensed lateral acceleration $A_y$ and the sensed or calculated steering rack load $F_r$ is provided to or determined by ECU 56 in data block 75. Process block 76 may use data values of $A_y$ and $F_r$, including changes in values of $A_y$ and $F_r$, to establish the relationship $\beta_v$ between $A_y$ and $F_r$. Having established the functional relationship $\beta_v$, process block 76 may use the value of a maximum available rack force $F_{r,max}$ from process block 74 to establish a value for a maximum lateral acceleration $A_{y,max}$ that actuator 26 can support. Process block 77 establishes envelopes with curvature $\rho$ varying with vehicle velocity $V_x$, such as exemplary envelopes 62, 64, 66, 68, 69 using $A_{y,max}$ and equation 2 and stores such envelopes as data. Decision block 78 determines when actuator 26 is operating in its diminished mode of operation. Block 78 may use ECU diagnostic code or some diagnostic algorithm to determine if actuator 26 is in the normal or the diminished mode. When actuator 26 is not operating in its diminished mode of operation, the logic circles back and continues to check for diminished mode operation. Alternatively, the logic may go back to an earlier part of the logic to update the envelopes. When it is determined that actuator 26 is operating in a diminished mode, process block 79 determines an anticipated vehicle path curvature ρ. Data from the above-described autonomous vehicle sensors may be used in determining anticipated vehicle path curvature ρ. Block 79 may also revise the anticipated vehicle path curvature due to the operation mode change. The program continues to process block 80 which selects from among the available envelopes. With an envelope selected and the curvature known, a suitable selected velocity is selected in process block 81. In an alternative configuration, the logic may determine an anticipated curvature path prior to determining whether actuator 26 is operating in its diminished mode. In such a configuration, the logic may update at least the value of anticipated curvature when the actuator operating mode is assessed. The program is then terminated at end block 82. Alternatively, the program may continue to be cycled through process blocks 79 through 81 to address additional turns and terminate responsive to a signal associated with a selected parameter such as vehicle shut-down.

Processing

Figure 6:
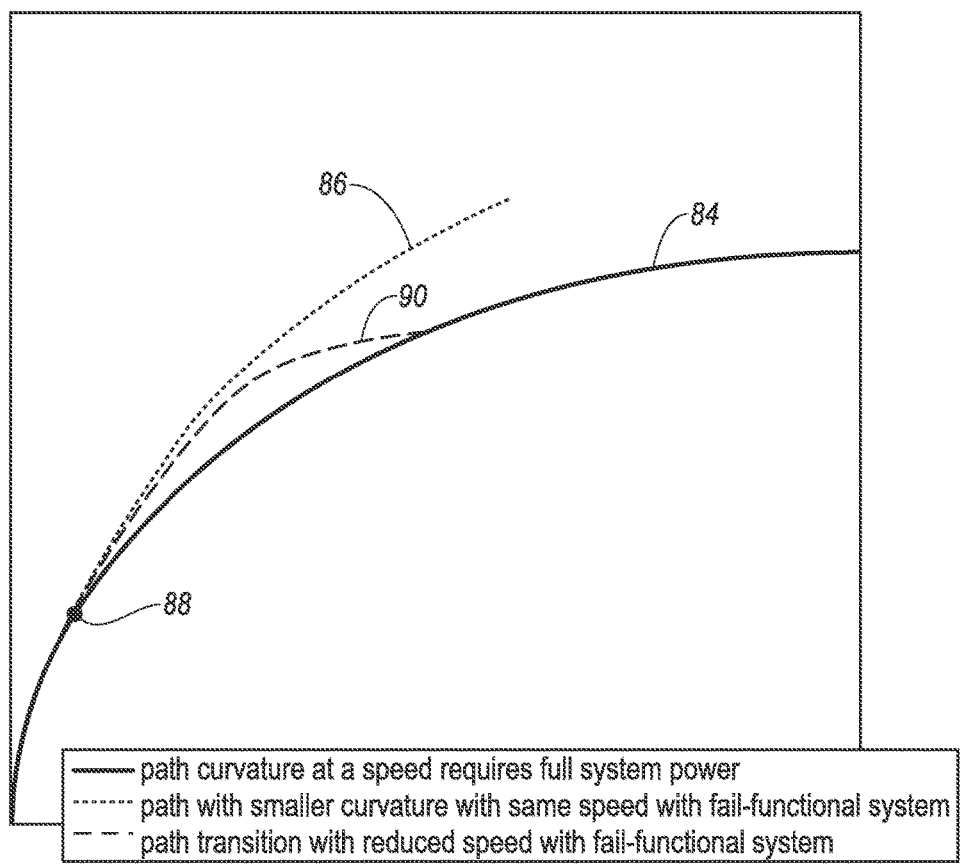
FIG. 6 is an exemplary plot of a vehicle path illustrating an exemplary performance of the disclosed system.

In an exemplary operation, steering system 12, as best seen in FIG. 6, compensates for a loss of available torque from actuator 26. FIG. 6 illustrates a two dimensional Cartesian coordinate representation of three paths of vehicle 10 with steering system 12 operating under three respective operation conditions:

1. a first arcuate path 84 followed by vehicle 10 traveling at a first velocity $V_{x1}$, $V_{x1}$ alternatively labelled as a measured or a current velocity, with actuator 26 fully functioning and providing full steering torque;
2. a second arcuate path 86 followed by vehicle 10 traveling continuously at first velocity $V_{x1}$ with actuator 26 operating in the diminished mode starting at a point 88 providing a diminished magnitude of torque; and
3. a third arcuate path 90 followed by vehicle 10 initially traveling at first velocity $V_{x1}$ with actuator 26 operating in the diminished mode starting at point 88 and providing a diminished magnitude of torque and with ECU transitioning the velocity of vehicle 10 to a second or selected velocity $V_{x2}$.

Path 84 illustrates a first exemplary vehicle path requiring steering system 12 be fully functional when vehicle 10 is traveling at first velocity $V_{x1}$ for vehicle 10 to be maintained on path 84. A first lateral acceleration $A_{y1}$ generated by executing such a maneuver at first velocity $V_{x1}$ requires more steering torque $T_m$ to sustain than actuator 26 is able to provide in the diminished mode of operation. In systems employing the logic of FIG. 5, speed and curvature envelopes are generated by process block 77. Actuator 26 is determined to not be operating in the diminished mode by decision block 78.

Path 86 illustrates a second exemplary vehicle path representing a path of vehicle 10 when actuator 26 begins to operate in the diminished mode at point 88. Steering system 12 is no longer able to provide enough torque $T_m$ to maintain vehicle 10 on path 84 if vehicle 10 continues to travel at first velocity $V_{x1}$. Actuator 26 provides insufficient torque $T_m$ to enable sustaining first lateral acceleration $A_{y1}$. Beginning at point 88, with velocity maintained at first velocity $V_{x1}$, the curvature of path 86 deviates from path 84, changing to a smaller curvature associated with a second lateral acceleration $A_{y2}$ sustainable by actuator 26 in its diminished performance mode. If path 84 represents a paved road, vehicle 10 would leave the paved road if first velocity $V_{x1}$ is maintained and actuator 26 is operating in its diminished mode. Path 86 illustrates what may occur if logic 71 is not available.

Path 90 illustrates the operation of the steering system 12 in accord with the present disclosure consistent with the logic of FIG. 5. Path 90 is coincident with path 84 until point 88, as actuator 26 is operating in its fully functional or regular mode of operation. At point 88, actuator 26 begins operation in its diminished mode. ECU 56 receives data indicating such a change in the operation of actuator 26, and determines that a transition from the normal mode of operation to the diminished mode of operation of actuator 26 has occurred. An anticipate path curvature is determined, consistent with process block 79. As noted above, data establishing target path 84 may be available to ECU 56 from autonomous vehicle sensors and additional data including map data and GPS data. ECU 56 selects or calculates an appropriate control envelope suited to the diminished available torque from actuator 26 and the anticipated curvature of target path 84. Once the envelope and curvature have been determined, and as per process block 81 of FIG. 5, ECU 56 selects a second velocity $V_{x2}$ suited to maintaining vehicle 10 on target path 84 given the curvature ρ of path 84. A transition velocity, lower than second velocity $V_{x2}$ may be selected by ECU 56 to enable vehicle 10 to return to target path 84 via a transition path comprising part of path 90. The transition path is illustrated by a deviation of path 90 from path 84. The transition path may include a curvature greater than the curvature of path 84, thus requiring the transition velocity that is less than second velocity $V_{x2}$. When the transition is complete, ECU operates steering system 12 in accord with the performance envelopes associated with the diminished mode of operation. The deviation of path 90 from path 84 may be reduced to a magnitude substantially impossible for observers to perceive. Such a deviation minimization may be achieved by the virtual driver minimizing the time between actuator 26 entering a diminished mode and the selection of an appropriate envelope and achieving a velocity enabling vehicle 10 to remain on path 84.

CONCLUSION

An exemplary system and method for using an actuator having a diminished operating mode have been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

With regard to the references to ECUs in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising a computing device that includes a processor and a memory, the memory storing instructions executable by the processor to:

determine a transition in performance of a steering system actuator of a vehicle to a diminished operating mode in which an available maximum steering system actuator torque is reduced;
determine a maneuverable envelope of vehicle velocity and path curvature adapted to the diminished operating mode based on the reduced available maximum steering system actuator torque;
determine a plurality of envelopes for a plurality of rates of displacement of a steering rack;
select an envelope and a vehicle velocity within the selected envelope for a path curvature; and
control the vehicle to achieve the selected vehicle velocity.

2. A system as claimed in claim 1, wherein the instructions further include:
to detect a lateral acceleration of a vehicle and determine the selected envelope as a function of the lateral acceleration.

3. A system as claimed in claim 1, wherein the instructions further include:
to detect a lateral acceleration of the vehicle;
to detect a rack force;
determine a functional relationship between the lateral acceleration and the rack force; and
determine the envelopes as a function of the functional relationship between the lateral acceleration and the rack force.

4. A system as claimed in claim 3, wherein the instructions further include:
determine a functional relationship between a rotational displacement of a pinion gear drivingly engaged with a steering rack and a rack displacement;
determine a maximum available actuator torque associated with a speed of rotation of the pinion gear; and
determine the envelopes with the functional relationship between the rotational displacement of the pinion gear and the rack displacement and with the maximum available actuator torque associated with the speed of rotation of the pinion gear.

5. A system as claimed in claim 4, wherein the actuator includes an electric motor drivingly connected to the pinion gear.

6. A system as claimed in claim 4, wherein the actuator includes redundant electric windings with two windings available for energization in a normal operating mode and only one winding available in the diminished operating mode.

7. A system as claimed in claim 1, wherein the envelopes include as a limit a line of an equation setting a vehicle velocity squared multiplied by a curvature equal to a constant lateral acceleration.

8. A system as claimed in claim 7, wherein the plurality of envelopes are determined for a plurality of values of lateral acceleration.

9. A system as claimed in claim 1, wherein the instructions further include:
determine an anticipated curvature in a vehicle path;
determine a current vehicle velocity; and
transition to the selected vehicle velocity when the current vehicle velocity exceeds the selected vehicle velocity.

10. A method of controlling a vehicle steering system, the method comprising:
determining a transition in performance of a steering system actuator of a vehicle to a diminished operating mode in which an available maximum steering system actuator torque is reduced;
determining a maneuverable envelope of vehicle velocity and path curvature adapted to the diminished operating mode based on the reduced available maximum steering system actuator torque;
determining a plurality of envelopes for a plurality of rates of displacement of a steering rack;
selecting an envelope and a vehicle velocity within the selected envelope for a path curvature; and
controlling the vehicle to achieve the selected vehicle velocity.

11. A method as claimed in claim 10, further comprising:
detecting a lateral acceleration of a vehicle and determining the envelopes as a function of the lateral acceleration.

12. A method as claimed in claim 10, further comprising:
detecting a lateral acceleration of the vehicle;
detecting a rack force;
determining a functional relationship between the lateral acceleration and the rack force; and
determining the envelopes as a function of the functional relationship between the lateral acceleration and the rack force.

13. A method as claimed in claim 12, further comprising:
determining a functional relationship between a rotational displacement of a pinion gear drivingly engaged with a steering rack and a rack displacement;
determining a maximum available actuator torque associated with a speed of rotation of the pinion gear; and
determining the envelopes with the functional relationship between the rotational displacement of the pinion gear and the rack displacement and with the maximum available actuator torque associated with the speed of rotation of the pinion gear.

14. A method as claimed in claim 13, wherein the actuator includes an electric motor drivingly connected to the pinion gear.

15. A method as claimed in claim 13, wherein the actuator includes redundant electric windings with two windings available for energization in a normal operating mode and only one winding available in the diminished operating mode.

16. A method as claimed in claim 10, wherein the envelopes include as a limit a line of an equation setting a vehicle velocity squared multiplied by a curvature equal to a constant lateral acceleration.

17. A method as claimed in claim 16, wherein the plurality of envelopes are determined for a plurality of values of lateral acceleration.

18. A method as claimed in claim 10, further comprising:
determining an anticipated curvature in a vehicle path;
determining a current vehicle velocity; and
transitioning to the selected vehicle velocity when the current vehicle velocity exceeds the selected vehicle velocity.

* * * * *